(12) United States Patent
Holfelder et al.

(10) Patent No.: US 8,510,286 B1
(45) Date of Patent: Aug. 13, 2013

(54) METHOD, ARCHITECTURE AND PLATFORM FOR CONTENT TAKEDOWN ON THE INTERNET

(75) Inventors: Wieland Holfelder, Planegg (DE); Andreas Michael Tuerk, Woerthsee (DE); Stephan Micklitz, Sauerlach (DE); Christian Brumm, Munich (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/301,550

(22) Filed: Nov. 21, 2011

(51) Int. Cl.
*G06F 17/30* (2006.01)
(52) U.S. Cl.
USPC .............. 707/706; 707/713; 707/726
(58) Field of Classification Search
USPC .......................... 707/706, 713, 726
See application file for complete search history.

(56) References Cited

U.S. PATENT DOCUMENTS

| | | | | |
|---|---|---|---|---|
| 6,314,439 | B1* | 11/2001 | Bates et al. | 715/209 |
| 6,581,063 | B1* | 6/2003 | Kirkman | 1/1 |
| 8,214,380 | B1* | 7/2012 | Bettinger et al. | 707/758 |
| 2005/0222900 | A1 | 10/2005 | Fuloria et al. | |
| 2006/0161561 | A1* | 7/2006 | Tsai | 707/100 |
| 2008/0155701 | A1* | 6/2008 | Martinez et al. | 726/27 |
| 2008/0214215 | A1* | 9/2008 | Aaltonen et al. | 455/466 |
| 2008/0275763 | A1 | 11/2008 | Tran et al. | |
| 2009/0144326 | A1 | 6/2009 | Chastagnol et al. | |
| 2009/0172154 | A1* | 7/2009 | Aviles Sanchez et al. | 709/224 |
| 2009/0276425 | A1* | 11/2009 | Phillips et al. | 707/6 |
| 2009/0279798 | A1 | 11/2009 | Massimino | |
| 2009/0324006 | A1 | 12/2009 | Lu et al. | |
| 2010/0131588 | A1* | 5/2010 | Loftus | 709/203 |
| 2010/0169655 | A1 | 7/2010 | Chastagnol et al. | |

* cited by examiner

*Primary Examiner* — Hanh Thai
(74) *Attorney, Agent, or Firm* — Birch, Stewart, Kolasch & Birch, LLP (57) ABSTRACT

A method of providing search results may include receiving a query including search parameters from a client, executing a search of a database based on the search parameters to obtain search results, determining whether one or more of the search results support take-down functionality, appending an indicator to one or more of the search results support take-down functionality, and providing the search results to the client with the appended graphical indicator corresponding to those search results that support take-down functionality. Further, the determining whether the one or more search results support take-down functionality may include obtaining an identifier of the one or more search results, adding a predefined code to the identifier, and determining whether the identifier with the added predefined code is a valid identifier of a resource provided by the same provider that provides the one or more search results.

23 Claims, 10 Drawing Sheets

METHOD, ARCHITECTURE AND PLATFORM FOR CONTENT TAKEDOWN ON THE INTERNET

TECHNICAL FIELD

The technical field relates to search engines that may surface billions of articles, images, videos, and other pieces of data. Sometimes various pieces of data need to be removed (taken down).

BACKGROUND

A search engine surfaces billions of articles, images and videos ("content") through its search engine. For various reasons (DMCA, privacy laws, content provider terms of service, etc.) people may have a desire or right to demand that some of the content surfaced by the search engine be taken down (i.e., made inaccessible on the Internet). Some people mistakenly believe that the search engine returning the results (surfaced content) owns this content and should be responsible for taking down inappropriate or personal content once users complain to the search engine and/or request that the content be taken down. This is a burden for a search engine, and overlooks the fact that a search engine crawls the web and indexes content that is publicly available and owned or controlled by a third party. In other words, the search engine does not actually own or control the content that it indexes. Therefore, the search engine cannot take down content from a content provider's servers, as those are owned and controlled by the content provider.

In addition, even after content has been removed through a takedown process by a content provider, it may take some time for the search engine to update its index to avoid surfacing the content that has been taken down.

SUMMARY

In an embodiment, a method of providing search results comprises obtaining search results; determining whether one or more of the obtained search results support take-down functionality; appending an indicator to the one or more of the search results that support take-down functionality; and providing the search results to a client with the appended indicator corresponding to those search results that support take-down functionality.

In an embodiment, the method further comprises receiving a query from the client; and executing a search of a database based on the query to obtain the search results.

In an embodiment, the determining whether the one or more search results support take-down functionality includes determining whether a content provider of a particular search result implements take-down functionality.

In an embodiment, the determining whether the one or more search results support take-down functionality includes obtaining an identifier of the one or more search results; adding a predefined code to the identifier; and determining whether the identifier with the added predefined code is a valid identifier of a resource provided by the content provider of the one or more search results.

In an embodiment, the determining whether the one or more search results support take-down functionality includes parsing a sitemap file; and detecting a designated tag in the sitemap file, the designated tag specifying an identifier for a take-down page.

In an embodiment, the appending the indicator includes adding a graphical icon to a hyperlink pointing to the one or more search results.

In an embodiment, a graphical icon is a hyperlink to a take-down page associated with the content provider that is providing the one or more search results.

In an embodiment, a hyperlink of the icon uniquely identifies a specific piece of content.

In an embodiment, a graphical icon is a hyperlink to a preview page including an area displaying at least a portion of content identified by the hyperlink pointing to the one or more search results, and a hyperlink to a take-down page associated with the content provider that is providing the one or more search results.

In an embodiment, a hyperlink to the take-down page associated with the content provider that is providing one or more search results is displayed in a second area outside of the area displaying at least the portion of content.

In an embodiment, the appending the indicator includes adding an additional text string to a hyperlink pointing to the one or more search results.

In an embodiment, an additional text string is a hyperlink to a take-down page associated with a content provider that is providing the one or more search results.

In an embodiment, a hyperlink of the additional text string uniquely identifies a specific piece of content.

In an embodiment, an additional text string is a hyperlink to a preview page including an area displaying at least a portion of content identified by the hyperlink pointing to the one or more search results, and a hyperlink to a take-down page associated with a content provider that is providing the one or more search results.

In an embodiment, a hyperlink to the take-down page associated with a content provider that is providing the one or more search results is displayed in a second area outside of the area displaying at least the portion of content.

In an embodiment, a method of servicing a take-down request comprises presenting a collection of identifiers of content to a client; receiving a first take-down request from the client, the first take-down request identifying one or more of the identifiers having been presented; generating a second take-down request based on the first take-down request; and transmitting the second take-down request to a provider of the content identified by the first take-down request.

In an embodiment, a presented collection of identifiers is a response to a search request received from the client.

In an embodiment, a collection of identifiers includes graphical indicators indicating whether a provider of content identified by the identifiers supports take-down functionality.

In an embodiment, a method includes directing a client to a page provided by a provider of the content identified by a first take-down request, the page enabling the client to generate a third take-down request.

In an embodiment, a method includes updating a search index to indicate that content identified by the first take-down request has been requested to be taken down.

In an embodiment, a method includes scheduling of re-crawling of a website hosting the content identified by the first take-down request.

In an embodiment, a system for providing search results comprises a processor receiving a query from a client; a database storing information searchable in response to the query; and a crawler updating the information in the database, wherein the processor obtains search results from the database, determines whether one or more of the obtained search results support take-down functionality, and provides the search results to the client with an identification of those results that support take-down functionality.

In an embodiment, a processor determines whether a content provider of a particular search result implements takedown functionality.

In an embodiment, a processor obtains an identifier of the one or more search results, adds a predefined code to the identifier, and determines whether the identifier with the added predefined code is a valid identifier of a resource provided by the content provider of the one or more search results.

In an embodiment, a processor parses a sitemap file, and detects a designated tag in the sitemap file, the designated tag specifying an identifier for a take-down page.

In an embodiment, a processor appends an indicator including a graphical icon to a hyperlink pointing to the one or more search results.

In an embodiment, a graphical icon is a hyperlink to a preview page including an area displaying at least a portion of content identified by the hyperlink pointing to the one or more search results, and a hyperlink to a take-down page associated with the content provider that is providing the one or more search results.

In an embodiment, a hyperlink to a take-down page associated with a content provider that is providing the one or more search results is displayed in a second area outside of the area displaying at least the portion of content.

In an embodiment, a crawler is notified of take-down request from the client.

In an embodiment, a crawler is scheduled to re-crawl a site hosting a result that has been identified by a take-down request from the client.

DETAILED DESCRIPTION

Figure 1:
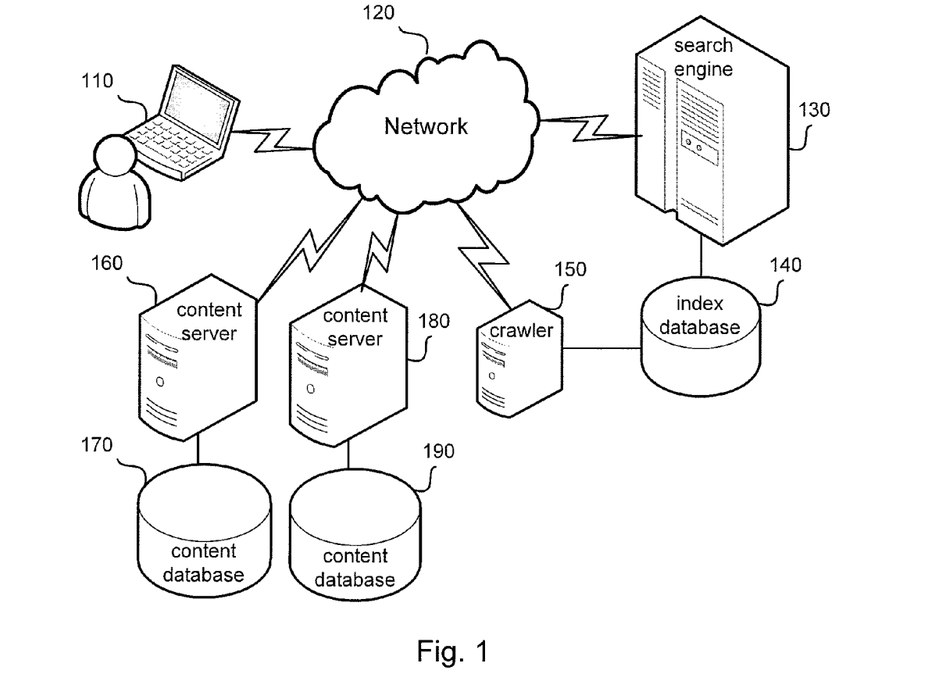
FIG. 1 illustrates an example of a network environment with a search engine.

FIG. 1 illustrates a user at terminal 110 connected to network 120. As would be understood by one of ordinary skill in the art, network 120 may be the Internet, or another type of network. The network 120 interconnects other entities, including search engine 130 content server 160 and content server 180.

In the non-limiting example of FIG. 1, the search engine 130 is connected to an index database 140. The index database 140 stores an index of crawled content. Crawler 150 is also connected through network 120 and crawls the network to discover or surface content. An index of the crawled content is stored in the index database 140. The crawler 150 may periodically re-crawl web sites that it has previously crawled update the index database 140. The crawler 150 may also receive notification that content on a particular site has changed, or has been removed. The crawler 150 may then be scheduled to re-crawl the particular site, or may instead immediately re-crawl the particular site.

Content server 160 is connected to content database 170 and serves content on network 120. Publicly accessible content (e.g., web pages) served by content server 160 is discovered by crawler 150, which updates the index database 140 based on the crawled content.

Content server 180 is connected to content database 190 and also serves content on the network 120. It is understood that many more content servers can be connected through network 120, and that content servers 160 and 180 are used as an illustrative example.

Figure 2:
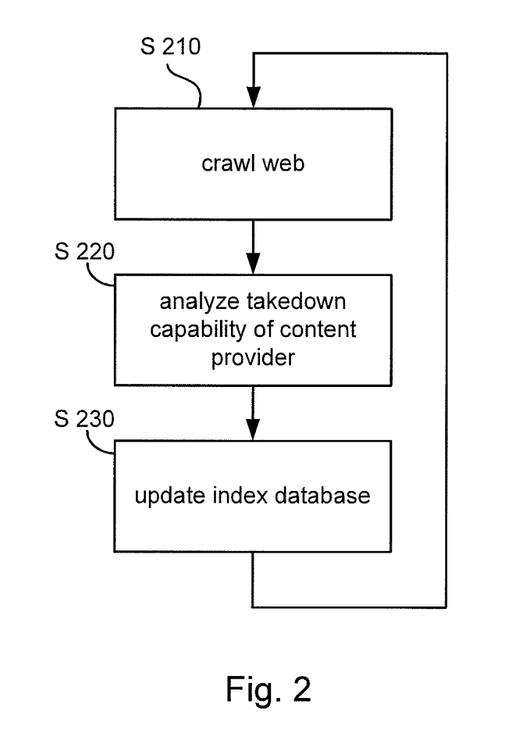
FIG. 2 illustrates an example of a process of analyzing takedown functionality.

FIG. 2 illustrates a non-limiting example of a crawling process that takes into account takedown functionality or takedown support of content providers who operate content servers 160 and 180. The crawling process can be viewed as an iterative process, where the crawler 150 discovers content served by content servers 160 and 180. In operation S 210 the crawler 150 crawls the network and discovers available content.

For particular content discovered in operation S 210, the crawler discovers availability of takedown functionality of a content provider in operation S 220. Thus, for every piece of content or web page an analysis of operation S 220 can be performed. Alternatively, the analysis can be performed for each content server discovered through the crawling process, or for each content provider. Takedown functionality can also be specified for certain URL patterns belonging to a host. For example, http://host.domain/%pattern% where the "%pattern%" specifies the particular URL pattern to be matched.

Based on the results of the analysis in operation S 220, the index database 140 is updated in operation S 230 to reflect that a particular web page, a piece of content, a particular content server, or a particular content provider provides takedown functionality.

Figure 3:
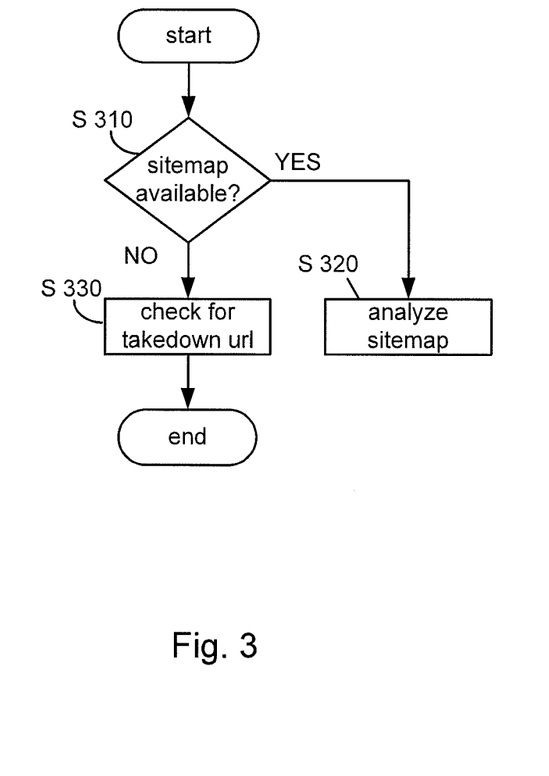
FIG. 3 illustrates an example of an implementation of analyzing takedown functionality.

FIG. 3 illustrates a non-limiting example of the analysis to determine whether takedown functionality is provided. During the crawling process, a determination is made whether a particular website has a sitemap available in operation S 310. A sitemap is an xml file, such as "sitemap.xml" that is discoverable to a search engine.

If a sitemap is available, the sitemap is analyzed in operation S 320. The sitemap may include the content shown in Example 1 below:

EXAMPLE 1

Excerpt from sitemap.xml

<url>
<loc>http://example.com/request-takedown</loc>
<takedown:remove-url/>
</url>

As shown in the example above, the sitemap is using a designated xml namespace called "takedown." Of course, it will be readily understood that a different label could be used to designate the takedown namespace. In the example, "remove-url" specifies the URL of the actual web page that provides takedown functionality for the website. In the example above, for the website "example.com" the takedown functionality is implemented through the page "http://example.com/request-takedown." The presence of the takedown URL in the sitemap informs the search engine that the website or the content provider serving that website supports takedown functionality.

Example 2 below shows a different sitemap that could also indicate the availability of takedown functionality.

EXAMPLE 2

Excerpt from sitemap.xml

```
<url>
<loc>http://example.com/my-takedown-api.xml</loc>
<takedown:api-url/>
</url>
```

The sitemap in example 2 indicates that the URL contains xml file mapping parameters, which can be used to perform the actual takedown of content.

If a sitemap is not found to be available in operation S 310, it is still possible to determine whether a website supports takedown functionality by checking for the presence or availability of a particular URL in operation S 330. For example, if the website providing content is called "example.com," it is possible to construct a URL matching a particular mask, such as appending a phrase like "isupporttakedown.html" to the URL of the website, and checking whether such constructed URL is valid. In this example, the search engine would check whether "http://example.com/isupporttakedown.html" is a valid URL. If it is valid, it can be determined that the website example.com does support takedown functionality.

The analysis of takedown functionality can be used to update the index database 140. Thus, when a search query matches a website, it is possible to also readily indicate whether the website supports takedown functionality.

Figure 4:
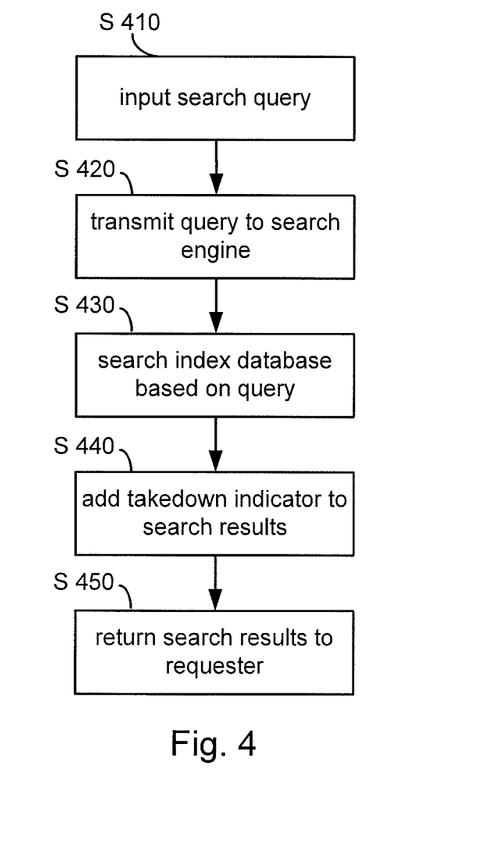
FIG. 4 illustrates an example of a process of servicing a search request.

FIG. 4 illustrates a non-limiting example of servicing a user's search query. In operation S 410 a user inputs a search query through a terminal 110 or any other device. In operation S 420 the search query is transmitted through the network 120 to the search engine 130. The search engine 130 analyzes the search query and performs a search of the index database 140 based on the analysis of the query. The search may return many results including various webpages on websites and other pieces of content. The results are then further analyzed in operation S 440, to determine whether one or more of the results are hosted on a website that supports takedown functionality.

As shown in operation S 440, an indicator is added to those results that are hosted by websites that support takedown functionality. Such an indicator can be a graphical icon added on top, adjacent to, or in some other way associated with a particular result. The indicator can also be text, such as "TAKEDOWN ENABLED" or any other text conveying that a particular result is hosted on a site that supports takedown functionality.

Figure 5A:
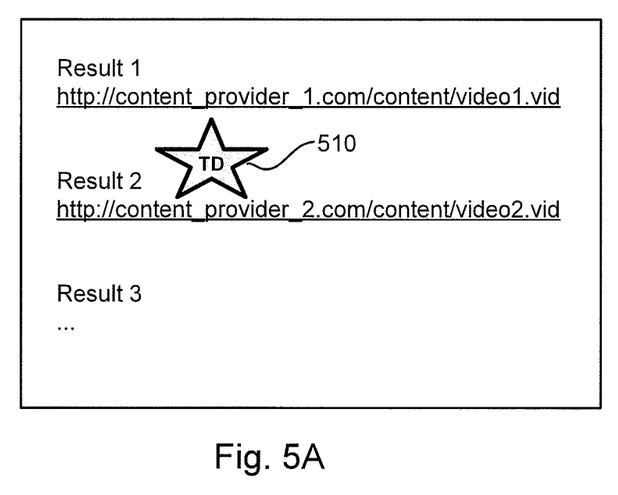
FIGS. 5A, 5B, and 5C illustrate examples of search results with takedown functionality.
Figure 5B:
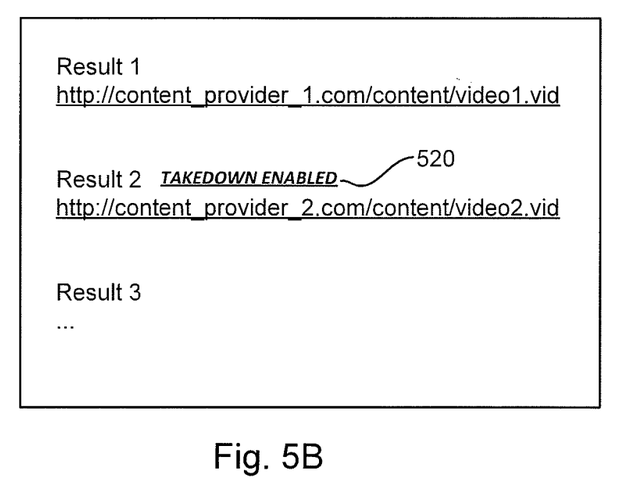

In operation S 450 the search results are returned and presented to the user. FIGS. 5A and 5B illustrate non-limiting examples of the indicator that has been added to search results from websites that support takedown functionality.

As illustrated in FIG. 5A, a star 510 is added to "Result 2." Thus, "Result 2" is more readily visible and may attract the user's attention. The addition of such a graphical indicator can serve as an incentive to content providers to enable takedown functionality on their websites, thus making their content stand out in search results.

FIG. 5B illustrates a text indicator 520 labeled "Takedown Enabled" added to "Result 2." This text, or other text, can be used to convey the idea that a particular website in the search results supports takedown functionality.

The indicators 510 and 520 can themselves be a link to a page that performs takedown of content. The indicators can also be configured or programmed in a way to present a text box to the user when the user hovers their mouse pointer (or an alternative interface controller, such as physical pointer over a touch sensitive surface or display) over the indicator, explaining what the indicator means and how takedown works.

The user may also preview pages referenced by the search results by hovering the mouse pointer over the search result. A separate preview page can also be provided to show the user a preview of the search result. A preview may help the user recognize content that is objectionable and or that needs to be taken down for other reasons.

Figure 5C:
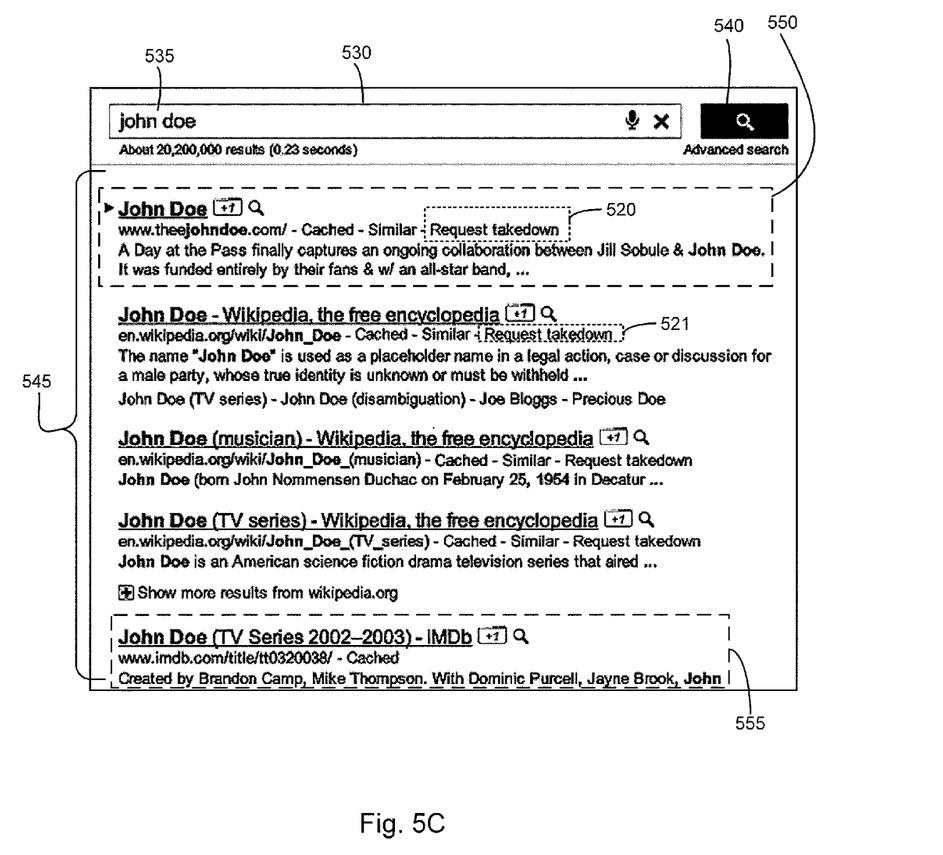

FIG. 5C illustrates an exemplary interface of an implementation with an input field 530 which receives input from the user. The user may input a search query 535 into the input field 530, and then execute a search by pressing or clicking search request button 540. Various search results 545 may be returned. One or more of the search results may indicate support for takedown functionality by displaying text indicator 520. The results may be ordered with results that support takedown functionality, such as result 550, higher in the order than results that do not support takedown functionality, such as result 555.

As shown in FIGS. 5A-C, the user is presented with various search results. The user may have a reason to request takedown of some content that has appeared in the search results. For example, "Result 2" may be objectionable for various reasons. The user may click on the takedown functionality indicator.

Figure 5D:
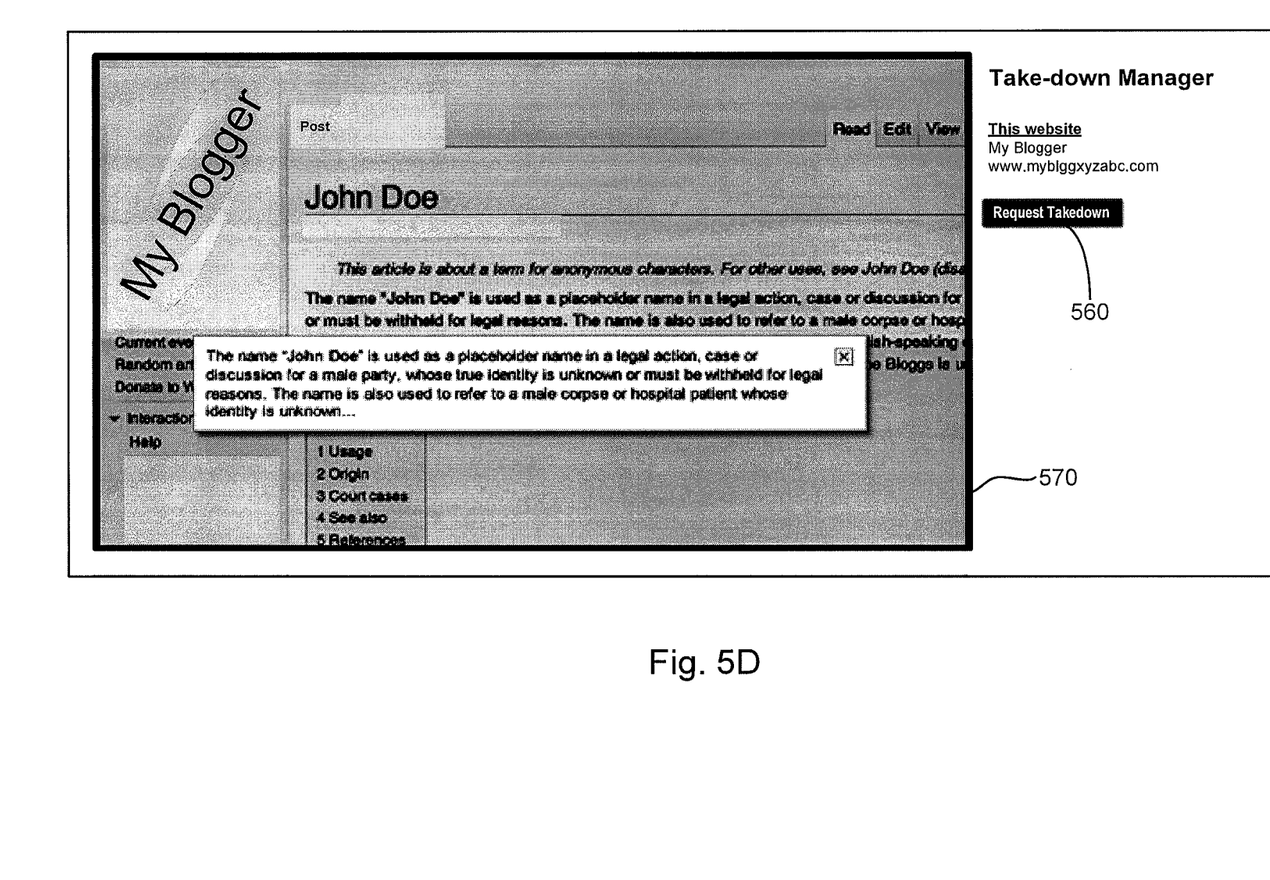
FIG. 5D illustrates an example of a takedown request display.

In the example of FIG. 5C the user may click on indicator 521 associated with one of the results 545. As shown in FIG. 5D, the potentially questionable content may be displayed in a frame or a light box 570 highlighting the questionable content of the selected result, with action buttons 560 displayed near the frame 570. The action buttons 560 may include a button labeled "Request takedown" or similar, to enable the user to make a takedown request.

The action button 560 is provided by the search engine. When the user clicks or presses the action button 560 ("Request Takedown"), the user is directed to the content provider's takedown page and continues the takedown process there.

Figure 6:
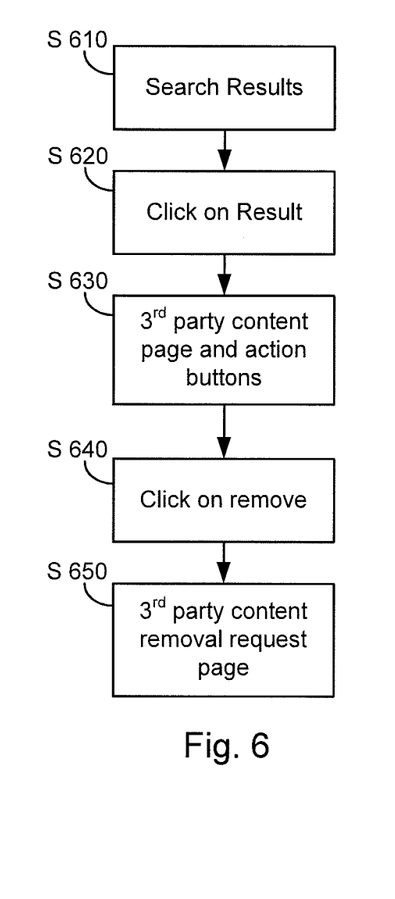
FIG. 6 illustrates an example of a process of a user performing a search and requesting takedown of content.

FIG. 6 illustrates a non-limiting example of an overview of the takedown operation. In operation S 610 search results, such as results 545 in FIG. 5C, are presented to the user. The user may click on one or more of the results in operation S 620. By clicking on a result the user may get a better understanding of the content linked to the search result and decide whether content should be taken down. The user may also preview the content in other ways, or skip operation S 620 completely.

For example, as illustrated in FIG. 5D, a 3$^{rd}$ party content page and action buttons may be displayed in operation S 630. The example of FIG. 5D is just one possible way to preview the page linked by the selected result, before the user actually requests takedown.

The user may also click on the takedown indicator 520 in operation S 620. The content provider or owner's page linked by the search result will be displayed for the user, with a lightbox highlighting central content from the website for which the user can request takedown. The content provider's page may also display action buttons that are used to perform the content takedown operation.

In operation S 640 the user may click on or press an action button provided by the content provider, which may immediately cause the content to be taken down, or may further open a dedicated content removal request page, as shown in operation S 650. From the dedicated content removal request page the user may take additional actions as directed by the content provider to cause content to be taken down.

Figure 7:
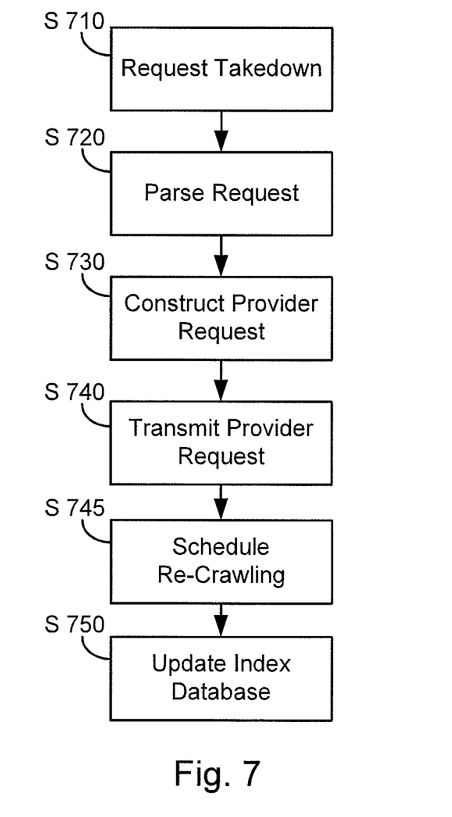
FIG. 7 illustrates an example of a process of servicing a takedown request.

FIG. 7 illustrates a non-limiting example of a takedown process requested by the user. In operation S 710 the user requests the takedown. This may be by clicking on the takedown indicator, or by some other method.

In operation S 720 the search engine receives the takedown request and parses the request. As explained above, websites may implement different levels of takedown functionality and may support different APIs and formats for receiving takedown requests. The search engine may refer to the index database 140 or directly to the website to determine the appropriate format of a takedown request to be sent to the website.

In the case of Example 1 discussed above, the website includes a sitemap with the following information:
<url>
<loc>http://example.com/request-takedown</loc>
<takedown:remove-url/>
</url>

The information inside the <loc> tags in the sitemap specifies the location of a page providing the takedown functionality of the website. The operator of the website may implement the functionality to remove the content from their content database or make it publicly inaccessible. The <takedown:remove-url/> tag specifies that the location identified by <loc> is the actual takedown page.

In this example the search engine may generate a request that looks as shown below: http://example.com/request-takedown?url=[content to remove]&query=[additional parameters]

Thus the location within the <loc> tag is used as the base URL (http://example.com/request-takedown) and additional parameters "url" and "query" may be added. The "url" parameter specifies the location of the content to take down.

The URL is stored in an index and identifies the page where the content surfaces. It is the content provider's responsibility to identify the right piece of content to be taken down from their page. Thus, content takedown is available for pages which uniquely identify a piece of content, such as a video view page, an image page, a text page (such as an article, a blog, or a wiki), and combinations thereof.

The "query" parameter may hold additional information about the search request that the user originally transmitted to the search engine. In some instances, the query parameter may be the same search query that the user entered into the search engine. This information can be used by the website owner to optimize their placement in future searches.

In the case of Example 2 discussed above, an excerpt from the sitemap is shown below. This scenario may arise when website owners already have some kind of content take-down site available and provide their own specification in an xml file. The website owners can provide an xml file with the appropriate mappings for their existing parameters. This xml file is referenced in sitemap.xml. An example excerpt from a sitemap.xml is shown below.
<url>
<loc>http://example.com/my-takedown-api.xml</loc>
<path>regexp</path>
<takedown:api-url/>
</url>

The "regexp" introduced above can be a regular expression and can be used to provide the takedown functionality for a subset of pages of the current site. The regular expression provides a concise and flexible ability to match strings of text, such as particular characters, words, or patterns of characters to specify a range of pages within the current site.

All files on a host that are indexed by crawler 150 might be available for take-down. However, in some large domains it may be helpful to enable a more focused ability to specify particular pages where take-down is available. In these cases the sitemap file may specify a regular expression as shown in the example above, to specify a pattern of URLs for which take-down can be requested. For example, <path> could specify "/videos/.*" to indicated that only URLs including the string "/videos/." support takedown functionality.

Although the sitemap in the example above uses the tag <path> to indicate the regular expression, other tags can be used. For example, the tag <pattern> could be used to specify the pattern to be matched in a URL.

In another implementation, the sitemap may reference "my-takedown-api.xml" file. An excerpt from the file is shown below:
<takedown-api>
<takedown-url>http://example.com/request-takedown</takedown-url>
<params>
  <url>u</url>
  <query>q</query>
</params>
</takedown-api>

The <takedown-url> tag identifies the URL of the takedown page, and the <params> tag identifies the parameters that are expected by the takedown page. The <url> tag specifies that the URL of the content to be taken down is to be identified by the letter "u." The <query> tag specifies that additional query parameters are to be identified by the letter "q." It is understood that the above is a non-limiting example, and other arrangements are possible.

Based on Example 2, the search engine will generate a request that looks like "http://example.com/request-takedown?u= . . . &q= . . . " where the "u" identifies the URL of the content to be taken down, and the "q" provides the user's search query.

In operation S 740 the takedown request is transmitted to the website owner or operator. This may be a HTTP POST/GET to the URL describe above, constructed based on the takedown URL.

The website operator will then make a decision to take down the identified content, or resolve the request in some other way.

In operation S 745 a re-crawling of the content provider's site is scheduled. It may be scheduled to occur at a predetermined time and/or date, or may simply indicate in increase in re-crawling frequency. By re-crawling the content provider's site the content subject to the take-down request can be removed from the index database 140 more quickly than under regularly scheduled crawling.

In operation S 750 the search engine may update the index database 140 to remove or otherwise render inaccessible the content that has been taken down. Operation S 750 may take place after operation S 745, or operation S 745 may be skipped and operation S 750 may proceed without a re-crawling. Thus, even if the content is not immediately removed from the website hosting the content, the search engine is able to update the index database 140 to avoid returning results with that content which has been subject to a takedown request. Further, even if the content is immediately removed from the website serving the content, it could take some time before the crawler 150 discovers that the content is no longer available on the website. Thus, the updating of the index database 140 based on the takedown request avoids the delay in updating the index database 140.

Alternatively, the index database 140 can be updated when the website is recrawled, and it is noted that the content has been taken down.

Figure 8:
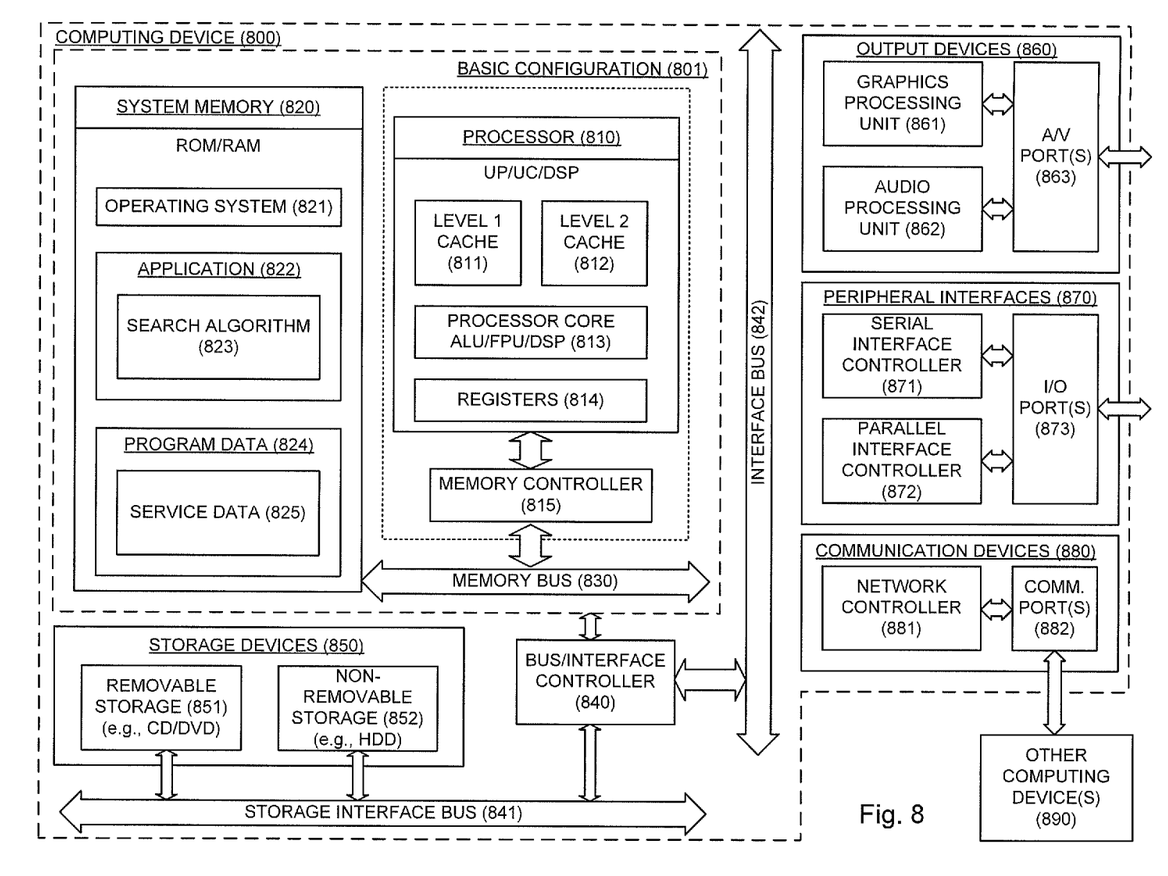
FIG. 8 is a block diagram illustrating an example computing device that can perform various functions of a search engine, a crawler, and an index database.

FIG. 8 is a block diagram illustrating an example computing device 800 that can be configured to perform the various functions of the search engine 130, the crawler 150, and the index database 140. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes a searching and takedown analysis algorithm 823 that is arranged to perform the processes described above. Program Data 824 includes searching and takedown data 825. In some embodiments, application 822 can be arranged to operate with program data 824 on an operating system 821. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which can be arranged to facilitate communications with one or more other computing devices 890 over a network communication via one or more communication ports 882. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one implementation, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative implementation of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of providing search results, comprising:
obtaining search results;
determining whether one or more of the obtained search results support take-down functionality, the determining including determining whether a content provider of a particular search result implements take-down functionality;
appending an indicator to the one or more of the search results that support take-down functionality, the appending including adding a graphical icon to a hyperlink pointing to the one or more search results, the graphical icon being a hyperlink to a preview page including
an area displaying at least a portion of content identified by the hyperlink pointing to the one or more search results, and
a hyperlink to a take-down page associated with the content provider that is providing the one or more search results; and
providing the search results to a client with the appended indicator corresponding to those search results that support take-down functionality.

2. The method according to claim 1, further comprising:
receiving a query from the client; and
executing a search of a database based on the query to obtain the search results.

3. The method according to claim 1, wherein the determining whether the one or more search results support take-down functionality includes:
obtaining an identifier of the one or more search results;
adding a predefined code to the identifier; and
determining whether the identifier with the added predefined code is a valid identifier of a resource provided by the content provider of the one or more search results.

4. The method according to claim 1, wherein
the determining whether the one or more search results support take-down functionality includes:
parsing a sitemap file; and
detecting a designated tag in the sitemap file, the designated tag specifying an identifier for a take-down page.

5. The method according to claim 1, wherein
the graphical icon is a hyperlink to a take-down page associated with the content provider that is providing the one or more search results.

6. The method according to claim 5, wherein
the hyperlink of the icon uniquely identifies a specific piece of content.

7. The method according to claim 1, wherein
the hyperlink to the take-down page associated with the content provider that is providing the one or more search results is displayed in a second area outside of said area displaying at least the portion of content.

8. The method according to claim 1, wherein the appending the indicator includes
adding an additional text string to a hyperlink pointing to the one or more search results.

9. The method according to claim 8, wherein
the additional text string is a hyperlink to a take-down page associated with the content provider that is providing the one or more search results.

10. The method according to claim 9, wherein
the hyperlink of the additional text string uniquely identifies a specific piece of content.

11. A method of providing search results, comprising:
obtaining search results;
determining whether one or more of the obtained search results support take-down functionality, the determining including determining whether a content provider of a particular search result implements take-down functionality;
appending an indicator to the one or more of the search results that support take-down functionality, the appending including adding an additional text string to a hyperlink pointing to the one or more search results; and
providing the search results to a client with the appended indicator corresponding to those search results that support take-down functionality, wherein
the additional text string is a hyperlink to a preview page including
an area displaying at least a portion of content identified by the hyperlink pointing to the one or more search results, and
a hyperlink to a take-down page associated with the content provider that is providing the one or more search results.

12. The method according to claim 11, wherein
the hyperlink to the take-down page associated with the content provider that is providing the one or more search results is displayed in a second area outside of said area displaying at least the portion of content.

13. A method of servicing a take-down request, comprising:
presenting a collection of identifiers of content to a client;
receiving a first take-down request from the client, the first take-down request identifying one or more of the identifiers having been presented;
generating a second take-down request based on the first take-down request;
transmitting the second take-down request to a provider of the content identified by the first take-down request, and
scheduling of re-crawling of a website hosting the content identified by the first take-down request.

14. The method according to claim 13, wherein
the presented collection of identifiers is a response to a search request received from the client.

15. The method according to claim 13, wherein
the collection of identifiers includes graphical indicators indicating whether a provider of content identified by the identifiers supports take-down functionality.

16. The method according to claim 13, further comprising:
directing the client to a page provided by the provider of the content identified by the first take-down request, the page enabling the client to generate a third take-down request.

17. The method according to claim 13, further comprising:
updating a search index to indicate that content identified by the first take-down request has been requested to be taken down.

18. A system for providing search results, comprising
a processor receiving a query from a client;
a database storing information searchable in response to said query; and
a crawler updating said information in said database, wherein
the processor
obtains search results from the database,
determines whether one or more of the obtained search results support take-down functionality, the determination including determining whether a content provider of a particular search result implements take-down functionality,
appends an indicator including a graphical icon to a hyperlink pointing to the one or more search results, and
provides the search results to the client with an identification of those results that support take-down functionality, and
the graphical icon is a hyperlink to a preview page including an area displaying at least a portion of content identified by the hyperlink pointing to the one or more search results, and a hyperlink to a take-down page associated with the content provider that is providing the one or more search results.

19. The system according to claim 18, wherein the processor obtains an identifier of the one or more search results, adds a predefined code to the identifier, and determines whether the identifier with the added predefined code is a valid identifier of a resource provided by the content provider of the one or more search results.

20. The system according to claim 18, wherein the processor parses a sitemap file, and detects a designated tag in the sitemap file, the designated tag specifying an identifier for a take-down page.

21. The system according to claim 18, wherein the hyperlink to the take-down page associated with the content provider that is providing the one or more search results is displayed in a second area outside of said area displaying at least the portion of content.

22. The system according to claim 18, wherein the crawler is notified of take-down request from the client.

23. The system according to claim 18, wherein the crawler is scheduled to re-crawl a site hosting a result that has been identified by a take-down request from the client.

* * * * *